US005463898A

United States Patent [19]

Blander et al.

[11] Patent Number: 5,463,898

[45] Date of Patent: Nov. 7, 1995

[54] METHOD OF DETECTING TIMING APPARATUS MALFUNCTION IN AN ENGINE

[75] Inventors: Richard S. Blander, Ann Arbor; Kenneth J. Wenzel, Farmington Hills; Venu G. Piska, Troy, all of Mich.

[73] Assignee: Chrysler Corporation, Highland Park, Mich.

[21] Appl. No.: 315,458

[22] Filed: Sep. 30, 1994

[51] Int. Cl.[6] .................................................. G01M 15/00

[52] U.S. Cl. ............................................ 73/116; 73/117.3

[58] Field of Search ..................................... 73/116, 117.3

[56] References Cited

U.S. PATENT DOCUMENTS

| | | | |
|---|---|---|---|
| 4,357,662 | 11/1982 | Schira et al. . | |
| 4,366,793 | 1/1983 | Coles . | |
| 4,380,800 | 4/1983 | Wilkinson . | |
| 4,787,355 | 11/1988 | Maeda | 123/414 |
| 4,924,830 | 5/1990 | Abe . | |
| 4,932,379 | 6/1990 | Tang et al. . | |
| 4,960,083 | 10/1990 | Seki et al. | 123/90.16 |
| 5,182,943 | 2/1993 | Fukui et al. | 73/116 |
| 5,195,471 | 3/1993 | Hara | 123/90.17 |
| 5,200,899 | 4/1993 | Ribbens et al. . | |
| 5,203,290 | 4/1993 | Tsuruta et al. | 123/90.17 |
| 5,239,473 | 8/1993 | Ribbens et al. . | |
| 5,245,968 | 9/1993 | Kolias et al. . | |
| 5,263,450 | 11/1993 | Hashimoto et al. | 123/487 |
| 5,333,577 | 8/1994 | Shinojima | 123/90.15 |

*Primary Examiner*—Richard Chilcot
*Assistant Examiner*—Eric S. McCall
*Attorney, Agent, or Firm*—Mark P. Calcaterra

[57] ABSTRACT

A method for detecting a mis-built engine due to camshaft and crankshaft misalignment and the skipping of a timing belt, timing chain, or timing gear mechanism by measuring an angular position of a camshaft imparted from a camshaft sensor to obtain an electrical signal representation thereof, measuring an angular position of a crankshaft imparted from a crankshaft sensor to obtain an electrical signal representation thereof, calculating an angular difference between the angular positions of the camshaft and crankshaft, comparing the angular difference between the angular positions of the camshaft and crankshaft, and an initial build reference value, determining if a timing mechanism malfunction has occurred, storing a fault code in memory if misalignment between the camshaft and crankshaft exists for subsequent retrieval by a service operator, and illuminating a malfunction indicator light.

11 Claims, 4 Drawing Sheets

METHOD OF DETECTING TIMING APPARATUS MALFUNCTION IN AN ENGINE

BACKGROUND OF THE INVENTION

1. Field of the Invention

The present invention relates generally to a method for giving early indication of possible irregularities in the alignment of a engine timing apparatus. More particularly, the present invention relates to a method for giving early indication to an operator and service technician of an engine when a timing belt skips a tooth, a timing chain skips a link, or a timing gear skips a tooth.

2. Description of the Related Art

In belt, chain, or gear driven overhead camshaft engine designs, timing belt, chain, or gear slippage can occur. If such slippage does occur, misalignment between the camshaft and crankshaft will result. The cause of timing belt, chain, or gear slippage is commonly the result of low belt, chain, or gear tension. This slippage can also be attributed to debris entering the timing cover or wear on the timing apparatus. Timing belt, chain, or gear slippage may lead to such undesirable conditions as excessive emissions, poor vehicle performance, bent valves, an aperture being punched in the cylinder head, or piston damage.

Vehicles currently provide clearance so that the intake/exhaust valves and the pistons do not interfere with each other during engine operation. Such clearance is provided by placing cuts or indentations in the top of each piston. A large clearance via an indentation in the top of each piston may prevent the pistons from interfering with the intake/exhaust valves if the timing apparatus slips. The primary disadvantage to having a large indentation in the top of each piston is that raw fuel will collect and rest in the indentations. This collection of raw or partial burnt fuel, that is expelled in the engine exhaust, will affect emission ratings. Since high emissions may result from deep indentations in the top of the piston, a large clearance between the piston and intake/exhaust valves cannot be designed into all engines. As a result, if a timing belt, chain, or gear slips, valve and piston interference may occur. Moreover, misalignment between the camshaft and crankshaft caused by timing apparatus slippage may lower engine performance and thereby reduce fuel economy. Therefore, it is desirable in the art of vehicles to have an early detection device for possible timing belt, chain, or gear slippage.

SUMMARY OF THE INVENTION

To achieve the foregoing objects, the present invention provides a method for detecting misalignment between a camshaft and crankshaft in a engine which will indicate that the timing belt, chain, or gear has skipped and thus needs to be serviced. The method first includes the step of receiving a signal representative of an angular position of a camshaft and crankshaft from a camshaft sensor and a crankshaft sensor. Signals representative of the angular positions of the camshaft and crankshaft are compared. The method then determines whether a misalignment between the camshaft and crankshaft exists. If the answer is in the affirmative, a fault code is stored in and an indication light is illuminated.

On start up the present invention, through the use of a diagnostic method, measures the distance between the falling edges of the camshaft and crankshaft frequency signals which are obtained from a camshaft and crankshaft sensor.

This initial build value is stored in the memory of an Engine Control Unit (ECU). Depending upon this reading, the methodology determines the angular difference between the camshaft and crankshaft positions. It is this value, in relation to an initial build value, which determines whether the method will continue to test or indicate to the operator and service technician that the timing belt, chain, or gear has skipped.

One advantage of the present invention is that the method can be used to sense a misalignment between the camshaft and crankshaft when a engine is first built. Thus, a mis-built engine can be indicated to engineers and plant technicians. In addition, the present invention acts as an early detection system, once the vehicle is in use, for timing belt, chain, or gear slippage, thus enabling the operator to take the vehicle in for maintenance before major engine repairs are required.

A further advantage of the present invention is that a method is provided to indicate when a timing belt, timing chain, or timing gear skips in a engine.

Moreover, in vehicles with small valve/piston clearance, this feature will serve to improve customer satisfaction by indicating to the operator before a significant reduction in engine performance occurs due to timing belt teeth, chain link, or gear teeth slippage.

Other objects, features and advantages of the present invention will become apparent by reference to the following detailed description when considered in conjunction with the accompanying drawings.

BRIEF DESCRIPTION OF THE DRAWINGS

In the drawings below, reference characters refer to like parts throughout the views, and wherein:

FIG. 2.B is a further detailing of the enabling conditions section of the flow chart of a engine timing apparatus malfunction method for the enablement conditions of FIG. 2.A;

FIG. 3 is a perspective view of a piston head and intake/exhaust valves.

DESCRIPTION OF THE PREFERRED EMBODIMENT(S)

Vehicles which contain internal combustion engines, commonly have a camshaft with small spaced cams attached for opening and closing piston valves. In addition, such vehicles also have a crankshaft with one or more cranks attached thereto for imparting motion to the engine transmission. Referring now to FIG. 3, a piston 16 and valves 19.*a*, 19.*b*, 19.*c*, 19.*d* are shown. In the top of each piston 16 are cuts or indentations 18.*a*, 18.*b*, 18.*c*, 18.*d* to prevent valve and piston interference. The depth of the indentations 18.*a*, 18.*b*, 18.*c*, 18.*d* may vary given engine type, make, and model. It is to be understood that shape or number of piston indentations on the top of each piston can vary according to the number of camshafts 78.*a*, 78.*b*, shown in FIG. 4, which exist in an engine. It is also possible that the vehicle has no indentations in each piston head.

Figure 4:
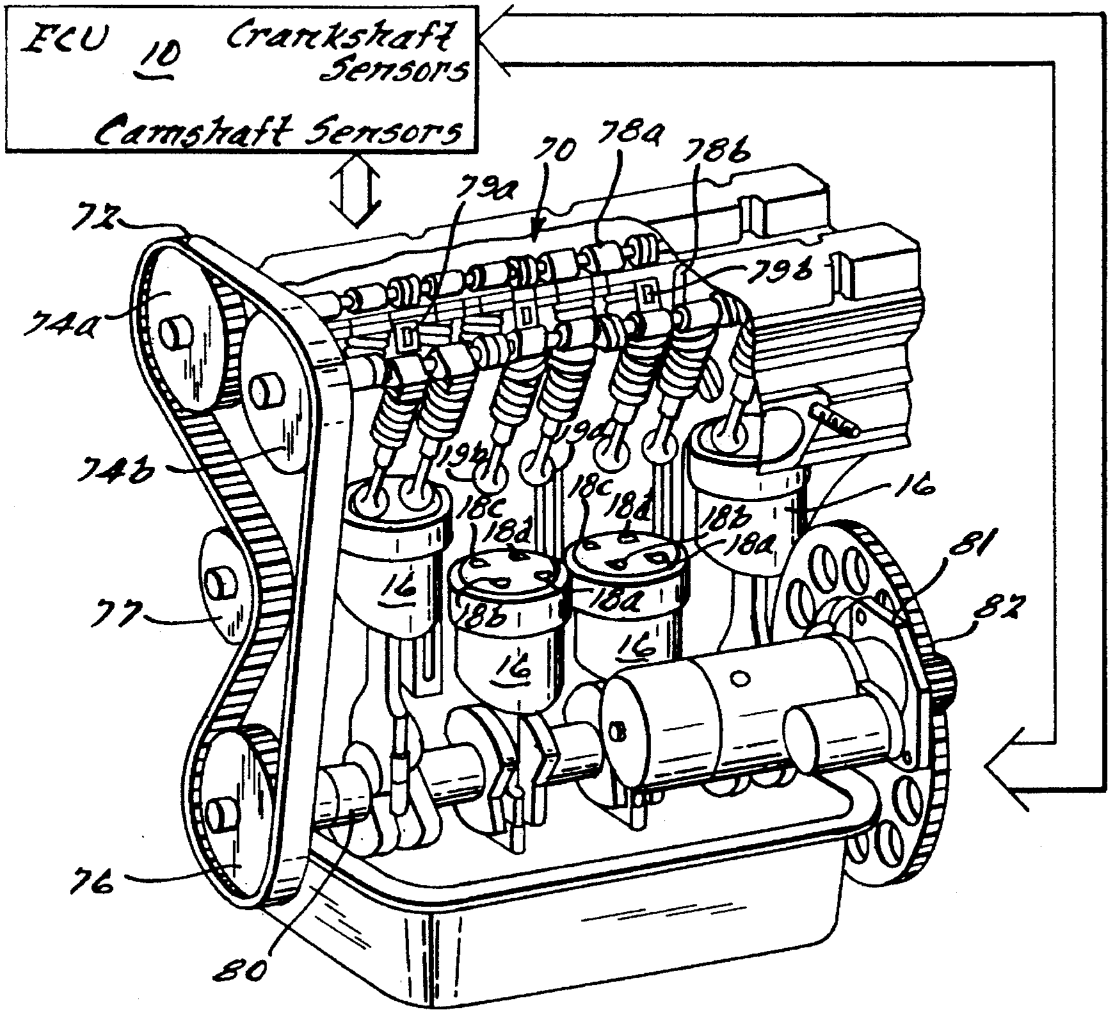
FIG. 4 is a perspective cutaway view of an engine with a cut away view of the piston and valves.

Commonly, dual overhead engines have two camshafts while other engines have a single camshaft. The present invention, as shown in FIGS. 3 and 4, displays a dual overhead camshaft engine but it is appreciated that the methodology is also fully functional on a single camshaft engine. The depth of the indentations 18.*a*, 18.*b*, 18.*c*, 18.*d* can also vary depending on the amount of piston and valve clearance which is built into any given engine. Thus, the pistons 16, valves 19.*a*, 19.*b*, 19.*c*, 19.*d*, and piston valve indentations 18.*a*, 18.*b*, 18.*c*, 18.*d*, as depicted in FIGS. 3 and 4, are met to be exemplary and not limiting to the scope of the present invention.

Referring now to FIG. 4, a cut-away view of an engine 70 is shown. The engine 70 has a crankshaft 80 for imparting vertical motion to pistons 16. The crankshaft 80 has pistons 16 operably connected to it. The crankshaft 80 further has a first end and second end. The first end is connected to a crankshaft sprocket 76. The second end of the crankshaft 80 is connected to a ring gear 82. In addition, the engine 70 also includes a crankshaft sensor 81 interconnected to the engine for taking readings of the angular position of the crankshaft 80. The engine 70 further consists of camshafts 78.*a*, 78.*b*. Piston valves 19.*a*, 19.*b*, 19.*c*, 19.*d* are operably connected to the camshafts 78.*a*, 78.*b* for providing motion to the valves 19.*a*, 19.*b*, 19.*c*, 19.*d*. The camshafts 78.*a*, 78.*b* have a camshaft sprocket 74.*a*, 74.*b* attached to one end. In addition, the engine 70 also includes camshaft sensors 79.*a*, 79.*b* connected to the engine for taking readings of the angular position of each camshaft 78.*a*, 78.*b*.

Partially disposed around a circumference of, and connecting the camshaft sprockets 74.*a*, 74.*b* and the crankshaft sprocket 76, is a timing belt 72 with a plurality of teeth. A tension sprocket 77 is also partially encompassed by the timing belt 72. The tension sprocket 77 is for adjusting the tension on the timing belt 72. While FIG. 4 shows a timing belt 72, it is to be expressly understood that other timing apparatuses could also be used such as a timing chain or timing gears.

Figure 1:
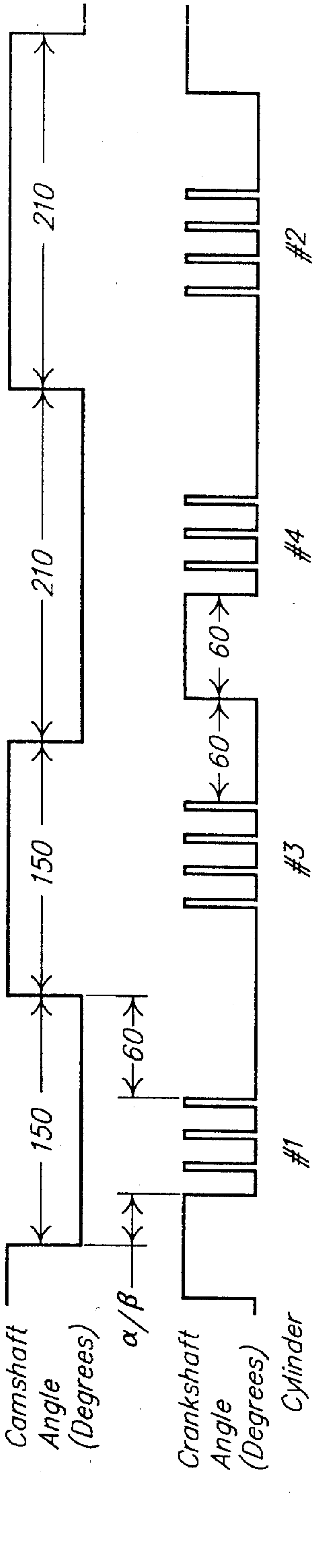
FIG. 1 illustrates signal representation timing diagrams denoting angular positions of a camshaft and a crankshaft.

The present invention provides a method for detecting a timing apparatus malfunctions in a vehicle. When a timing belt or chain skips at least one tooth or link, a change in relative angular distance between the camshaft and crankshaft will occur. This change is what is detected by the current methodology. To remedy the occurrence of a timing belt, chain, or gear slippage, a camshaft and crankshaft misalignment detection method is disclosed. In the present method, camshaft sensors 79.*a*, 79.*b* read the angular position of the camshafts 74.*a*, 74.*b*. A crankshaft sensor 81 reads the angular position of the crankshaft 80. As shown in FIG. 1, the timing diagram of the signal representations of the angular positions of the camshaft and the crankshaft are read, via the use of camshaft and crankshaft sensors, by the Engine Control Unit (ECU) 10 of the present invention as shown in FIG. 4. The ECU 10 includes a microprocessor, memory (volatile and non-volatile), bus lines (address, control, and data), and other hardware and software needed to perform the task of engine control. The ECU 10 measures the distance, designated as $\alpha$ on an initial reading and $\beta$ on subsequent readings, between a falling edge of the 210 degree pulse of the camshaft angular signal and a falling edge of a 69 degree crankshaft angular signal.

During the present methodology, the ECU 10 will initially take a reading representative of the distance $\alpha$ between a falling edge of the 210 degree pulse of the camshaft angular signal and a falling edge of a 69 degree crankshaft angular signal and store this as the initial build value during subsequent starts of the engine. In the preferred embodiment, the falling edge of the 69 degree crankshaft angular signal is taken from the number one cylinder. It is appreciated that any cylinder could also be employed. The initial build value is placed in a reset state at the engine manufacturing stage and is set by the ECU 10 during subsequent starts of the vehicle. The initial build value must be reset after servicing any engine component which will affect the camshaft and crankshaft timing system.

Figure 2:
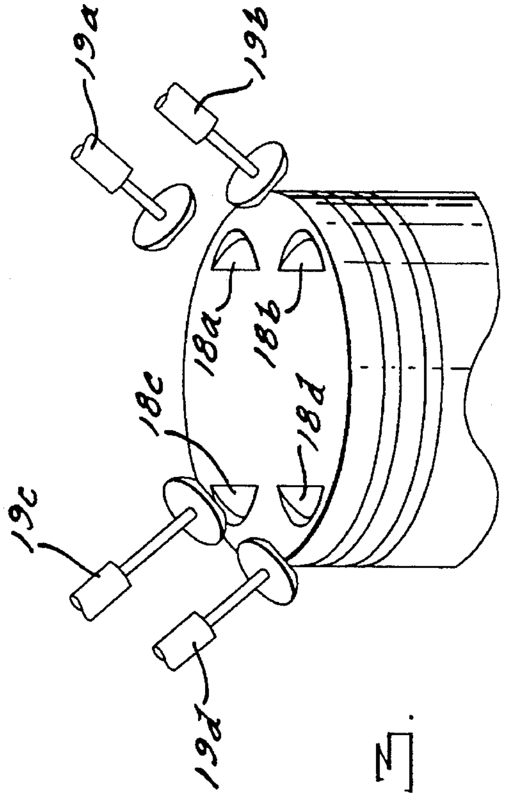
FIG. 2.A is a flow chart of a engine timing apparatus malfunction method.
Figure 2A:
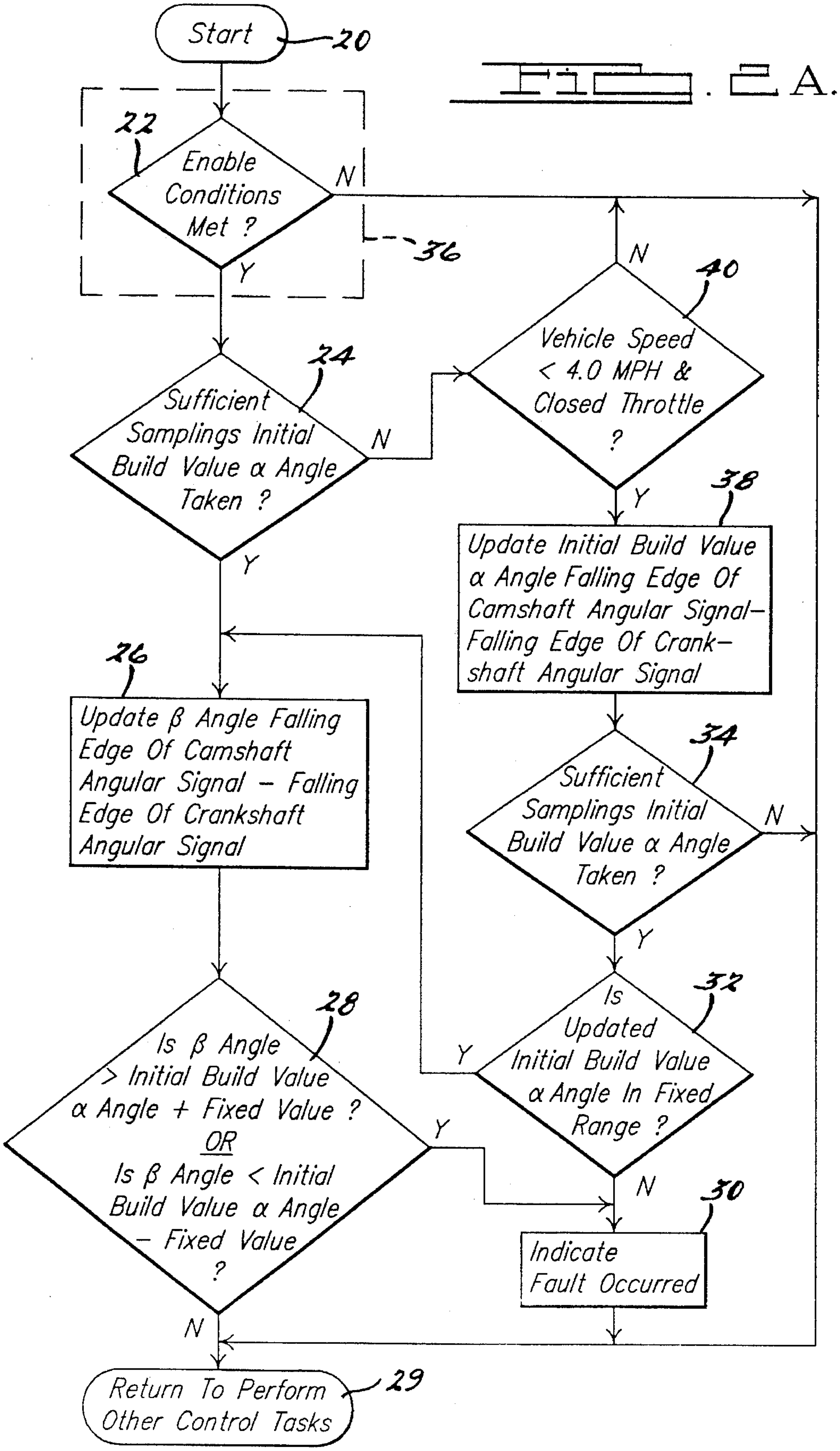
Figure 2B:
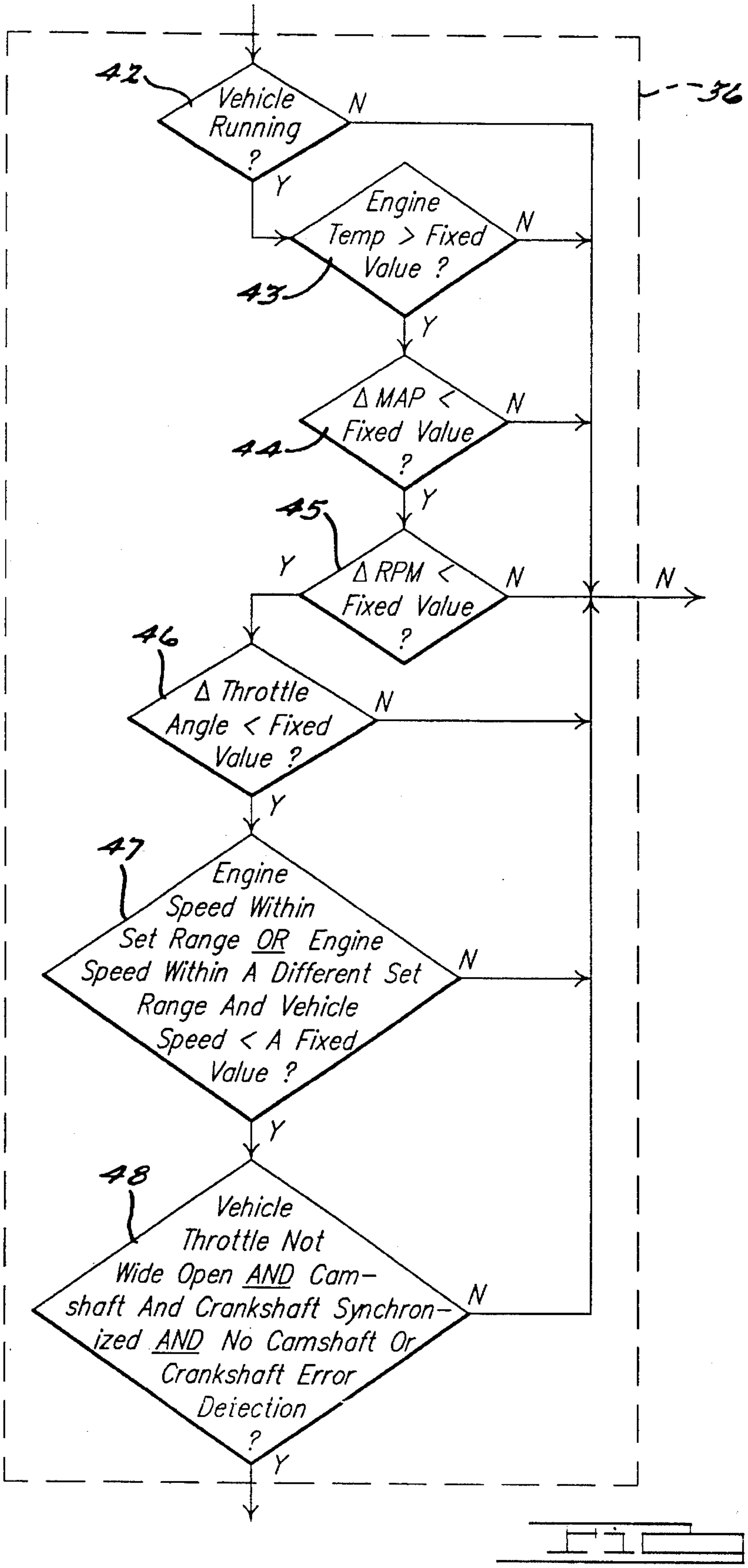

Referring now to FIG. 2.A, a method is disclosed to detect a misalignment between the camshafts 78.*a*, 78.*b* and crankshaft 80. As illustrated, the present misalignment detection method begins or starts in bubble 20 when the engine is running. From bubble 20, the methodology advances cyclically or alternatively on an interrupt basis to check the enabling conditions of the method generally designated decision block 22. At this time the ECU 10 checks to determine if all enablement conditions are satisfied before advancing. It must be stated, however, that the enablement conditions stated below may vary from vehicle to vehicle and may not be needed in different forms and manifestations of the present invention.

Block 36, as shown in FIG. 2.B, represents the dotted line schematic enlargement of methodology block 22 of FIG. 2.A. The first enablement condition checked by the ECU 10 in block 36 is whether the engine vehicle is turned on and running as displayed in block 42. In the preferred embodiment, an engine revolution speed of above approximately 500 RPMs is required to ensure that the engine is running. Moving on to the next enablement condition, it is then determined in decision block 43 if the engine temperature, as sensed by a temperature sensor that provides signals to the ECU 10, is greater than a certain stored fixed temperature value in memory of the ECU 10. The ECU 10 next determines in block 44 if the change in the manifold absolute pressure ($\Delta$MAP) is less than a stored fixed pressure value in memory of the ECU 10. The change in the revolutions per minute of the engine ($\Delta$RPM) is then checked in decision block 45 to determine if it is less than a stored RPM value in the memory of the ECU 10.

Another enablement condition which must be checked, in block 46, is whether the change in throttle angle is less than a stored fixed angular value in memory of the ECU 10. A further enable condition in block 47, which must be checked by the current methodology, is whether the engine speed/RPM is within a specified range or whether the engine speed/RPM is within a different specified range and the vehicle speed is less than a set speed value stored in memory of the ECU 10 to protect against any testing which may be done during engine resonant conditions. Moreover, for enablement to be initialized in block 48 it must be determined that: 1) the engine throttle must not be wide open; 2) the camshafts 78.*a*, 78.*b* and crankshaft 80 must be in synchronization; and 3) there is no camshaft sensor 79.*a*, 79.*b* or crankshaft sensor 81 initial error detections.

If any one of the enable conditions is not satisfied, the method exits to bubble 29 whereby the ECU 10 returns to perform other engine control tasks. If all the enablement conditions are met, however, the method continues on to block 24. At this step the methodology checks to determine whether a sufficient number of initial build value angle samplings have been taken. If the ECU 10 determines that all of the conditions in block 24 are true, the methodology falls through to block 26. In this block, angle $\beta$ is updated with the new angle equalling the difference between a 210 degree falling edge of the camshaft angular signal and the 69 degree falling edge of cylinder #1 of the crankshaft angular signal, as depicted in FIG. 1 as angle $\beta$. The method then moves to block 28 whereby the feature operation, to detect whether the camshaft 78.*a*, 78.*b* and crankshaft 80 have become misaligned, is implemented.

In block 28, an updated measurement of β angle is compared to determine if the value is greater than the sum of the initial build α angle and a fixed value or less than the difference of the initial build α angle and a fixed value. If neither of the conditions are satisfied, the methodology will exit to bubble 29 and the ECU 10 will execute other engine control tasks. If, however, one of the conditions in block 28 is met, the current method will advance to block 30 whereby a fault maturing process is carried out. If a plurality of fault conditions occur within a given interval, a code or flag is set in the memory of the ECU 10 during the execution of block 30 and a fault is indicated to the vehicle operator.

In the preferred embodiment, a malfunction indicator light will be illuminated to indicate to the engine vehicle driver of timing belt, chain link, or intermeshing gear teeth slippage. It is to be understood, however, that alerting a vehicle operator by an indicator light is one of many possible means that could be employed such as sound or code storage for later retrieval. The method then falls to bubble 29 and the methodology ends.

Referring back to decision block 24, if the ECU 10 determines that the initial α angle has not been read, the present method advances to block 40. In decision block 40, the methodology checks to determine if the vehicle speed is less than 4.0 miles per hour and if the throttle is closed. If one condition is not met in block 40, the methodology exits via bubble 29 and the ECU 10 continues to perform other engine control tasks. If, however, both conditions in decision block 40 are met, the methodology falls to block 38. In this part of the present method, the initial build value α is updated with a new reading of β angle, as shown in FIG. 1. After the initial build value α angle has been updated, the methodology falls through to decision block 34.

In decision block 34 the ECU 10 determines if there has been sufficient samplings of the angle β subsequent to start-up of the vehicle. If there has not been sufficient samplings, the methodology falls to bubble 29 whereby the ECU 10 exits to perform other tasks of engine control. Should the ECU 10 find that there has been sufficient samplings of the angle β, then the method falls to decision block 32. In this block, the ECU 10 determines whether the updated β angle is within a set range. It is in this stage that the ECU 10 has the ability to detect whether a mis-built engine has occurred by initially testing whether there is misalignment between the camshaft 78.*a*, 78.*b* and crankshaft 80.

If the ECU 10 determines that the newly updated β angle is not within a set range, the current method will advance to block 30 whereby a fault maturing process is carried out. If a plurality of fault conditions occur within a given interval, a code or flag is set in the memory of the ECU 10 for subsequent retrieval by an assembly plant or service technician, and a fault is indicated to the vehicle operator. In the preferred embodiment, a malfunction indicator light will be illuminated to alert the assembly plant technician or engineer of a mis-built engine due to camshaft and crankshaft misalignment. The method then falls to bubble 29 and exits.

If, however, the ECU 10 determines that both conditions are satisfied in decision block 32, the method returns to block 26 whereby the angle α is updated equalling the difference between a falling edge of the camshaft angle frequency signal and a falling edge of the crankshaft angle frequency signal, as depicted in FIG. 1 by the symbol β.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. In an engine and associated control system, the engine comprising at least one camshaft having an angular position at a given point in time, a crankshaft having an angular position at a given point in time, an ECU with corresponding memory, a method for detecting malfunction in an engine timing belt, the engine timing belt having a plurality of teeth, the method comprising the steps of:

measuring the angular position of the at least one camshaft;

measuring the angular position of the crankshaft;

determining if a misalignment between the at least one camshaft and the crankshaft has occurred by comparing a difference between the angular positions of the at least one camshaft and the crankshaft to a reference value; and determining if the engine timing belt has malfunctioned given misalignment between the at least one camshaft and the crankshaft as a result of the engine timing belt skipping at least one tooth.

2. The method of detecting malfunction in the engine timing belt of claim 1 wherein the malfunction detection method includes the step of storing a fault code in memory for subsequent retrieval by a service operator.

3. The method of detecting malfunction in the engine timing belt of claim 2 wherein the malfunction detection method includes the step of illuminating a malfunction indicator light upon malfunction of the engine timing belt.

4. In an engine and associated control system of a vehicle, the engine comprising at least one camshaft having an angular position at a given point in time, a crankshaft having an angular position at a given point in time, an ECU with corresponding memory, and a difference between the angular positions of the at least one camshaft and the crankshaft equal to an initial build value, a method for detecting malfunction in an engine timing apparatus of the vehicle, the method comprising the steps of:

waiting until a plurality of enabling conditions have been met;

measuring the angular position of the at least one camshaft imparted from at least one camshaft sensor to obtain an electrical signal representation thereof;

measuring an angular position of the crankshaft imparted from a crankshaft sensor to obtain an electrical signal representation thereof;

determining whether sufficient samplings of the initial build value have been taken;

waiting for the vehicle to reach a steady state operating condition comprising a speed of below approximately 4.0 miles per hour if sufficient samplings of the initial build value have not been taken;

updating an initial build value with the difference between the angular positions of the at least one camshaft and the crankshaft;

determining whether sufficient samplings of the initial build value have been taken;

checking to ascertain whether the updated initial build value is within a specified range;

storing a fault code in memory of the ECU if the updated initial build value is not within the specified range for subsequent retrieval by a service operator;

illuminating a malfunction indicator light to denote a mis-built engine if the updated initial build value is not within the specified range;

returning to check the enabling conditions if the updated initial build value is not within a specified second range;

taking a new reading of the difference between the angular positions of the at least one camshaft and the crankshaft if the updated initial build value is within a specified first range;

comparing the new angular difference reading to a second range of values;

determining whether the vehicle engine timing apparatus has malfunctioned;

storing a fault code in memory of the ECU if the vehicle engine timing apparatus has malfunctioned for subsequent retrieval by the service operator;

illuminating the malfunction indicator light if the vehicle engine timing apparatus has malfunctioned; and returning to check the enabling conditions if the updated initial build value is not within the second range.

5. The method of detecting malfunction in the vehicle engine timing apparatus of claim 4 wherein the enabling conditions consists of:

determining whether an engine revolutions per minute is greater than a fixed value;

determining whether an engine temperature is greater than a fixed temperature value;

determining whether a change in a manifold absolute pressure (ΔMAP) is less than a fixed pressure value;

determining whether a change in engine revolutions per minute (ΔRPM) is less than a stored RPM value;

determining whether a change in throttle angle is less than a fixed angular value; determining whether an engine speed is within a specified range or whether the engine speed is within a different specified range and a vehicle speed is less than a set speed value;

determining whether a vehicle throttle is less than a wide open position;

determining whether the at least one camshaft and the crankshaft are in a synchronization; and determining whether there is neither a camshaft nor a crankshaft initial malfunction.

6. In an engine and associated control system, the engine comprising at least one camshaft having an angular position at a given point in time, a crankshaft having an angular position at a given point in time, an ECU with corresponding memory, a method for detecting malfunction in an engine timing chain, the engine timing chain having a plurality of links, the method comprising the steps of:

measuring the angular position of the at least one camshaft;

measuring the angular position of the crankshaft;

determining if a misalignment between the at least one camshaft and the crankshaft has occurred by comparing a difference between the angular positions of the at least one camshaft and the crankshaft to a reference value; and determining if the engine timing chain has malfunctioned given misalignment between the at least one camshaft and the crankshaft as a result of the engine timing chain skipping at least one link.

7. The method of detecting malfunction in the engine timing chain of claim 6 wherein the malfunction detection method includes the step of storing a fault code in memory for subsequent retrieval by a service operator.

8. The method of detecting malfunction in the engine timing chain of claim 7 wherein the malfunction detection method includes the step of illuminating a malfunction indicator light upon malfunction of the engine timing chain.

9. In an engine and associated control system, the engine comprising at least one camshaft having an angular position at a given point in time, a crankshaft having an angular position at a given point in time, an ECU with corresponding memory, a method for detecting malfunction between intermeshing timing gears, the intermeshing timing gears having a plurality of teeth, the method comprising the steps of:

measuring the angular position of the at least one camshaft;

measuring the angular position of the crankshaft;

determining if a misalignment between the at least one camshaft and the crankshaft has occurred by comparing a difference between the angular positions of the at least one camshaft and the crankshaft to a reference value; and determining if the intermeshing timing gears have malfunctioned given misalignment between the at least one camshaft and the crankshaft as a result of the intermeshing timing gears skipping at least one tooth.

10. The method of detecting malfunction between the intermeshing timing gears of claim 9 wherein the malfunction detection method includes the step of storing a fault code in memory for subsequent retrieval by a service operator.

11. The method of detecting malfunction between the intermeshing timing gears of claim 10 wherein the malfunction detection method includes the step of illuminating a malfunction indicator light upon malfunction of the intermeshing timing gears.

* * * * *